US009971725B2

(12) United States Patent
Kimura (10) Patent No.: US 9,971,725 B2
(45) Date of Patent: May 15, 2018

(54) SEMICONDUCTOR DEVICE THAT EMPLOYS SATA POWER SUPPLY TERMINALS FOR DATA TRANSMISSION

(71) Applicant: TOSHIBA MEMORY CORPORATION, Tokyo (JP)

(72) Inventor: Naoki Kimura, Ebina Kanagawa (JP)

(73) Assignee: TOSHIBA MEMORY CORPORATION, Tokyo (JP)

( * ) Notice: Subject to any disclaimer, the term of this patent is extended or adjusted under 35 U.S.C. 154(b) by 46 days.

(21) Appl. No.: 15/061,810

(22) Filed: Mar. 4, 2016

(65) Prior Publication Data
US 2017/0075403 A1 Mar. 16, 2017

(30) Foreign Application Priority Data
Sep. 11, 2015 (JP) .................... 2015-180085

(51) Int. Cl.
*G06F 13/38* (2006.01)
*G06F 13/40* (2006.01)
*G06F 13/16* (2006.01)
*G06F 13/42* (2006.01)
*G06F 1/26* (2006.01)

(52) U.S. Cl.
CPC ............ *G06F 13/4068* (2013.01); *G06F 1/26* (2013.01); *G06F 13/1668* (2013.01); *G06F 13/4282* (2013.01)

(58) Field of Classification Search
CPC .............................. G06F 3/0607; G06F 13/385
See application file for complete search history.

(56) References Cited

U.S. PATENT DOCUMENTS

| 7,293,124 | B2 | 11/2007 | Nakabayashi | |
|---|---|---|---|---|
| 8,700,850 | B1* | 4/2014 | Lalouette | G06F 3/0679 710/11 |
| 9,158,722 | B1* | 10/2015 | Jenkins | G06F 13/385 |
| 2008/0200041 | A1* | 8/2008 | Lin | G11B 33/122 439/62 |
| 2011/0167177 | A1 | 7/2011 | Kouyama et al. | |

FOREIGN PATENT DOCUMENTS

JP      20012-82706     10/2001

* cited by examiner

*Primary Examiner* — Albert Wang
(74) *Attorney, Agent, or Firm* — Patterson & Sheridan, LLP (57) ABSTRACT

A semiconductor device includes a substrate having a serial advanced technology attachment (SATA) connector that has a plurality of power supply terminals and a plurality of signal terminals, a nonvolatile semiconductor memory unit disposed on the substrate, and a memory control circuit disposed on the substrate, configured to control the nonvolatile semiconductor memory unit, and having a data input terminal connected to a first power supply terminal of the SATA connector and a data output terminal connected to a second power supply terminal of the SATA connector. A serial signal of input data is transmitted from the first power supply terminal to the data input terminal, and a serial signal of output data is transmitted from the data output terminal to the second power supply terminal.

17 Claims, 8 Drawing Sheets

SEMICONDUCTOR DEVICE THAT EMPLOYS SATA POWER SUPPLY TERMINALS FOR DATA TRANSMISSION

CROSS-REFERENCE TO RELATED APPLICATION

This application is based upon and claims the benefit of priority from Japanese Patent Application No. 2015-180085, filed Sep. 11, 2015, the entire contents of which are incorporated herein by reference.

FIELD

Embodiments described herein relate generally to a semiconductor device, in particular, a semiconductor device that employs serial advanced technology attachment (SATA) power supply terminals for data transmission.

BACKGROUND

A serial advanced technology attachment (Serial ATA, SATA) interface, for example, is used for connection between a 2.5-inch solid state drive (SSD) and a host. Since SATA is a serial transmission protocol, there is no need for synchronization in data transmission unlike a parallel transmission method, and as a result SATA enables stable data transfer at high speed. Moreover, since a cable used in SATA is thin, SATA has advantages in space savings in hardware and an improvement in cooling efficiency.

DETAILED DESCRIPTION

One or more embodiments are directed to providing a semiconductor device that can suppress an increase in design cost, parts cost, and so forth.

In general, according to an embodiment, a semiconductor device includes a substrate having a serial advanced technology attachment (SATA) connector that has a plurality of power supply terminals and a plurality of signal terminals, a nonvolatile semiconductor memory unit disposed on the substrate, and a memory control circuit disposed on the substrate, configured to control the nonvolatile semiconductor memory unit, and having a data input terminal connected to a first power supply terminal of the SATA connector and a data output terminal connected to a second power supply terminal of the SATA connector. A serial signal of input data is transmitted from the first power supply terminal to the data input terminal, and a serial signal of output data is transmitted from the data output terminal to the second power supply terminal.

Hereinafter, a semiconductor device and a relay device (substrate) according to an embodiment will be described in detail with reference to the attached drawings. The present disclosure is not limited to the following embodiment.

Figure 1:
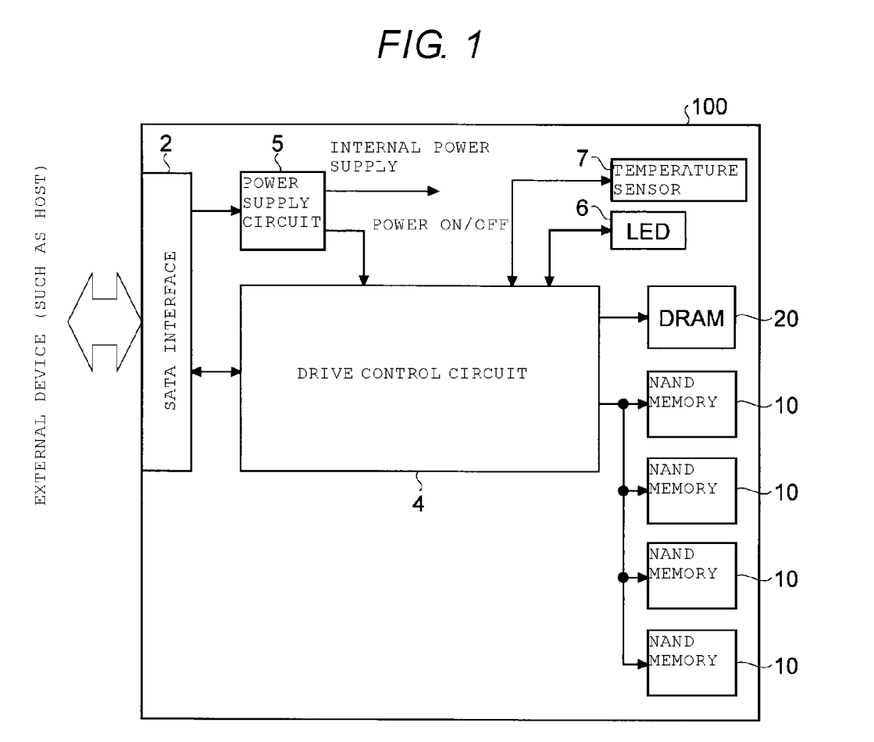
FIG. 1 is a block diagram of a semiconductor device according to an embodiment.

FIG. 1 is a block diagram of a semiconductor device 100 according to the present embodiment. The semiconductor device 100 is connected to a host via an SATA interface (I/F) 2, which is an interface that complies with the Serial ATA (SATA) standard, and functions as an external memory unit of the host. The host may be, for example, an information processing device such as a personal computer, a server, a mobile telephone, an imaging device, a mobile terminal such as a tablet computer or a smartphone, a game console, or a vehicle-mounted terminal such as a car navigation system. Moreover, the semiconductor device 100 can also transmit and receive data to and from a tester or the like via the SATA interface 2. Such a tester tests whether or not the semiconductor device 100 can perform a predetermined operation correctly. In the following description, the host, the tester, or the like will be referred to simply as an external device.

The semiconductor device 100 includes a NAND flash memory (NAND memory) 10 as a nonvolatile semiconductor memory element, a drive control circuit 4 as a controller, a DRAM 20, which is a volatile semiconductor memory element that can perform a higher-speed storage operation than the NAND memory 10, a power supply circuit 5, an LED 6 for displaying a state, and a temperature sensor 7 that detects the temperature in a drive. The temperature sensor 7 directly or indirectly measures the temperature of the NAND memory 10, for example. The drive control circuit 4 restricts, for example, the writing of information into the NAND memory 10 if the measurement result obtained by the temperature sensor 7 becomes a given temperature or higher and thereby suppresses a further increase in temperature.

The power supply circuit 5 generates a plurality of different internal direct-current power supply voltages, using external direct-current power supplied from a power supply circuit in the external device via the SATA interface 2, and supplies these internal direct-current power supply voltages to the circuits in the semiconductor device 100. Moreover, the power supply circuit 5 senses start-up of an external power supply, generates a power-on reset signal, and supplies the generated power-on reset signal to the drive control circuit 4.

Figure 2:
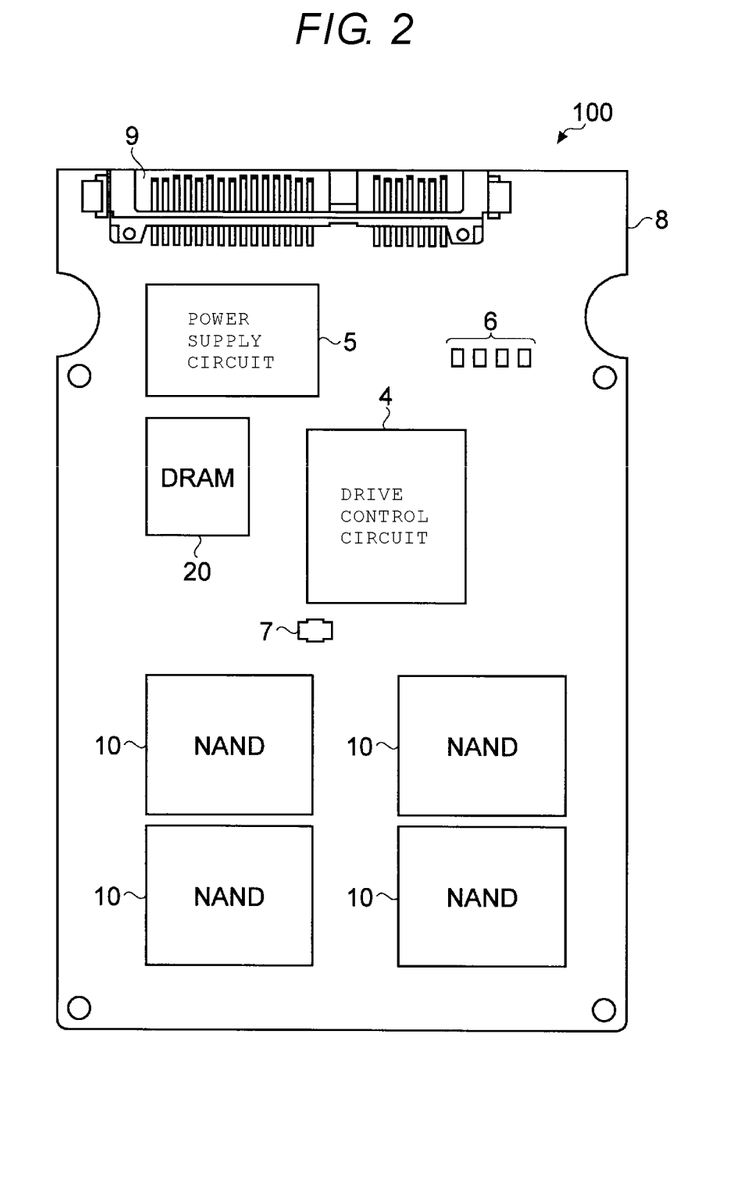
FIG. 2 is a plan view of the semiconductor device.

FIG. 2 is a plan view of the semiconductor device 100. The power supply circuit 5, the DRAM 20, the drive control circuit 4, and the NAND memory 10 are mounted on a wiring substrate 8, which has wiring patterns formed therein. The wiring substrate 8 is roughly rectangular in shape in the plan view. On a short edge of the roughly rectangular wiring substrate 8, a standard SATA interface connector (SATA connector) 9 which functions as the above-described SATA interface 2 by being connected to the external device is provided. The standard SATA interface connector 9 is a connector formed of a 15-pin DC input terminal provided for power supply input and a 7-pin SATA interface terminal provided for data input and output. The SATA connector 9 performs a function as a power supply input unit that supplies power from the external device to the power supply circuit 5.

The wiring substrate 8 has a multilayer structure formed of stacked synthetic resin layers and has an eight-layer structure, for example. Here, the number of layers of the wiring substrate 8 is not limited to eight. The wiring substrate 8 has, on the surfaces of the layers formed of synthetic resin or in the internal layers formed of synthetic resin, wiring patterns in various forms. The power supply circuit 5, the DRAM 20, the drive control circuit 4, and the NAND memory 10 which are mounted on the wiring substrate 8 are electrically connected to one another via the wiring patterns formed on and in the wiring substrate 8.

In the semiconductor device 100 described above, for writing (also called loading) of a program transmitted from the host into the DRAM 20 and debugging of the semiconductor device 100 performed using the tester, a serial signal such as a universal asynchronous receiver transmitter (UART) signal is used. Here, the program is a program required by the semiconductor device 100 to operate as a memory unit, and examples thereof include a program for making a processor (such as a CPU) implemented in the drive control circuit 4 execute operations such as writing and reading into and from the NAND memory 10. However, the standard specification SATA connector 9 formed of 7 pins for signals and 15 pins for power supply does not have a terminal (for example, an expansion terminal) for transmission of the serial signal such as the UART signal. For this reason, the semiconductor device 100 according to the embodiment transmits and receives the serial signal by using an interface connector (standard terminal) included in the SATA connector 9 as standard. Moreover, the UART signal is used as an example of the serial signal which the semiconductor device 100 transmits and receives.

Figure 3:
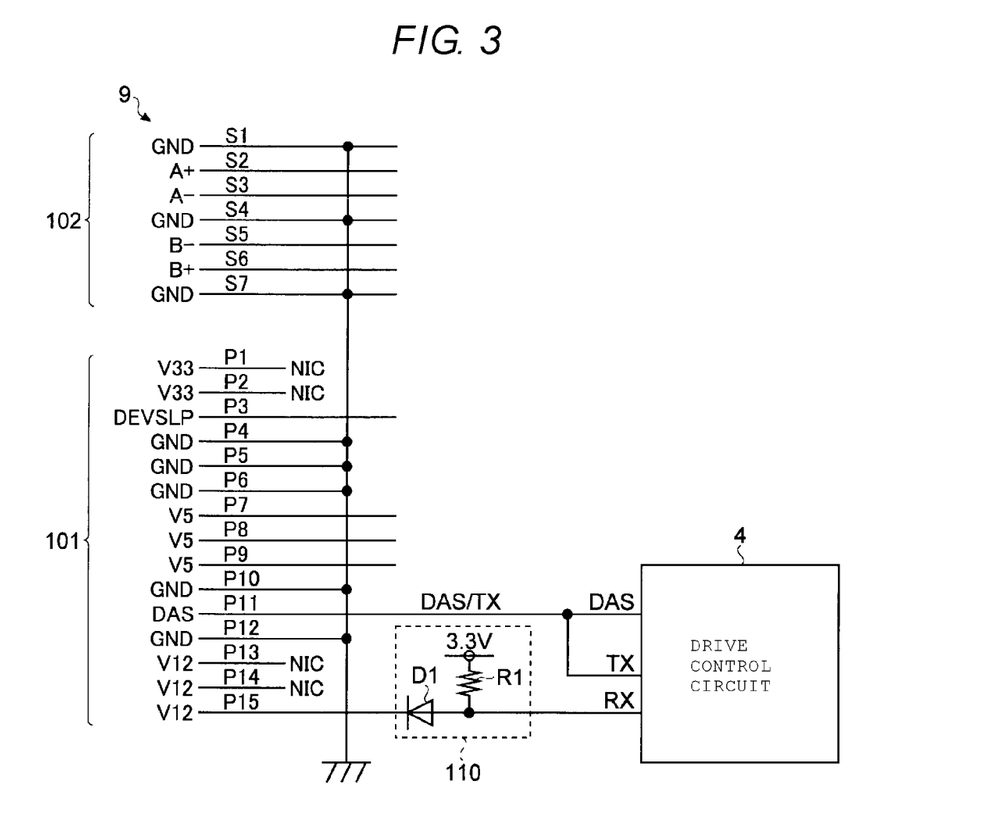
FIG. 3 illustrates terminal groups of an SATA connector in the semiconductor device according to the embodiment.

In FIG. 3, terminal groups of the SATA connector according to the present embodiment are depicted. As depicted in FIG. 3, the SATA connector (first connector) 9 includes, as standard terminals, a DC input terminal group 101 for power supply input and an SATA interface terminal group 102 for data input and output.

In the DC input terminal group (first terminal group) 101, a GND terminal is a grounding terminal. A V33 terminal is a power supply terminal (second power supply terminal) for DC +3.3 V, a V5 terminal is a power supply terminal (third power supply terminal) for DC +5 V, and a V12 terminal is a power supply terminal (first power supply terminal) for DC +12 V. Moreover, a DAS terminal is a terminal (first signal terminal) for transmitting an activity signal, which indicates an operational mode of the semiconductor device 100 and is output from the drive control circuit 4. A DEVSLP terminal is a terminal for power saving function (second signal terminal) which is used by the external device such as the host to provide instructions to the semiconductor device 100 to transition to a power saving mode or return from the power saving mode.

The semiconductor device 100 operates in a plurality of operational modes including a normal mode in which the semiconductor device 100 can perform a normal operation and a power saving mode during which power consumption of the semiconductor device 100 is smaller than the power consumption during the normal mode. The power saving mode is also referred to as a DEVSLP mode or a sleep mode. If the drive control circuit 4 receives an instruction from the external device such as the host to transition to the power saving mode via the DEVSLP terminal when the operational mode of the semiconductor device 100 is the normal mode, the drive control circuit 4 causes the operational mode of the semiconductor device 100 to transition to the power saving mode (assuming that a predetermined condition is met).

Moreover, if the drive control circuit 4 receives an instruction from the external device such as the host to transition to the normal mode via the DEVSLP terminal when the operational mode of the semiconductor device 100 is the power saving mode, the drive control circuit 4 causes the operational mode of the semiconductor device 100 to transition to the normal mode (assuming that a predetermined condition is met). If the operational mode of the semiconductor device 100 is the power saving mode, as a result of the drive control circuit 4 interrupting power supply to the NAND memory 10 and circuits in the drive control circuit 4, for example, the power consumption of the semiconductor device 100 becomes smaller than the power consumption during the normal mode.

In the SATA interface terminal group (second terminal group) 102, terminals S1, S4, and S7 which are GND terminals are grounding terminals. In the SATA interface terminal group 102, terminals S2 and S3 which are an A+ terminal and an A− terminal, respectively, and terminals S5 and S6 which are a B+ terminal and a B− terminal, respectively, are data signal line terminals used in pairs.

An unused power supply terminal of the terminals described above is assigned as a reception terminal (second terminal) RX used by the semiconductor device 100 to receive the UART signal from the outside (hereinafter, the UART signal received by the semiconductor device 100 will be referred to as a UART_RX signal). In the present embodiment, for example, a terminal P15, which is one of the V12 terminals, is assigned as the reception terminal for receiving the UART_RX signal. However, 12-volt power may be sometimes supplied from the external device such as the host to the V12 terminals including the terminal P15.

In the present embodiment, as depicted in FIG. 3, a pullup circuit 110 for voltage interruption, which includes a resistor R1 and a diode D1, is arranged on a wire (second wire) between the drive control circuit 4 and the terminal P15. The cathode of the diode D1 is connected to the terminal P15 of the DC input terminal group 101 via a wire (fourth wire), and the anode of the diode D1 is connected to the reception terminal RX of the drive control circuit 4 via a wire (fifth wire). The resistor R1 is connected, via a wire, between a terminal having a power supply voltage that is the same (3.3 V in FIG. 3) as the drive voltage of the drive control circuit 4 and the wire connecting the anode of the diode D1 and the reception terminal RX of the drive control circuit 4. By disposing the pullup circuit 110 having such a configuration between the terminal P15 (V12 terminal) and the drive control circuit 4, a supply of an overvoltage to the semiconductor device 100 is prevented.

As a transmission terminal (first terminal) TX used by the semiconductor device 100 to transmit the UART signal to the outside (hereinafter, the UART signal transmitted from the semiconductor device 100 will be referred to as a UART_TX signal), the DAS terminal (corresponding to a terminal P11) for transmitting the activity signal and disabling delay spin-up is assigned. In that case, the UART_TX signal and the DAS signal are multiplexed. In the present embodiment, a wire (third wire) connected to a terminal (third terminal) of the drive control circuit 4 from which the DAS signal is output and a wire (first wire) connected to a terminal of the drive control circuit 4 from which the UART_TX signal is output are joined and connected to the terminal P11. At this time, the output terminal of the drive control circuit 4 from which the UART_TX signal is output and the output terminal of the drive control circuit 4 from which the DAS signal is output may have an open drain structure in order to prevent backflow of the signal.

On the other hand, the external device such as the tester for debugging and a computer for loading a program may have a standard SATA interface connector that includes an expansion terminal for transmitting the UART signal. If such an external device is used, in the present embodiment, to allow the external device having the connector structure and the semiconductor device 100 to communicate the UART signal therebetween, a relay device having a standard SATA interface connector without an expansion terminal and another SATA interface connector with an expansion terminal is used.

Figure 4:
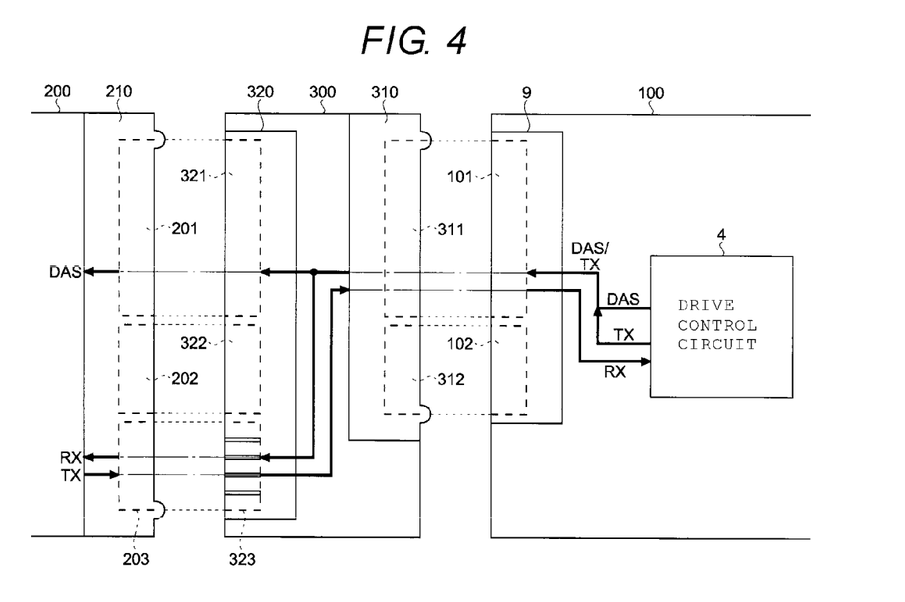
FIG. 4 illustrates the semiconductor device and an external device connected via a relay device according to the embodiment.
Figure 5:
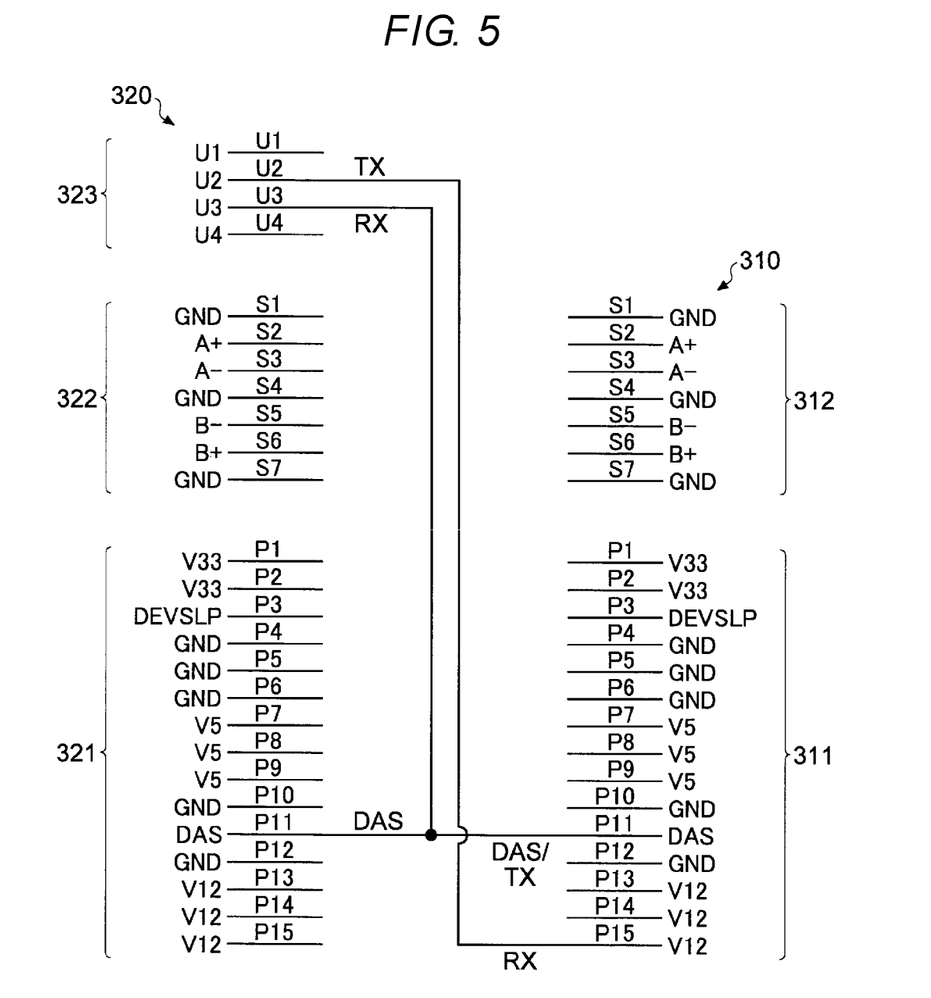
FIG. 5 illustrates terminal groups of the relay device depicted in FIG. 4.
Figure 6:
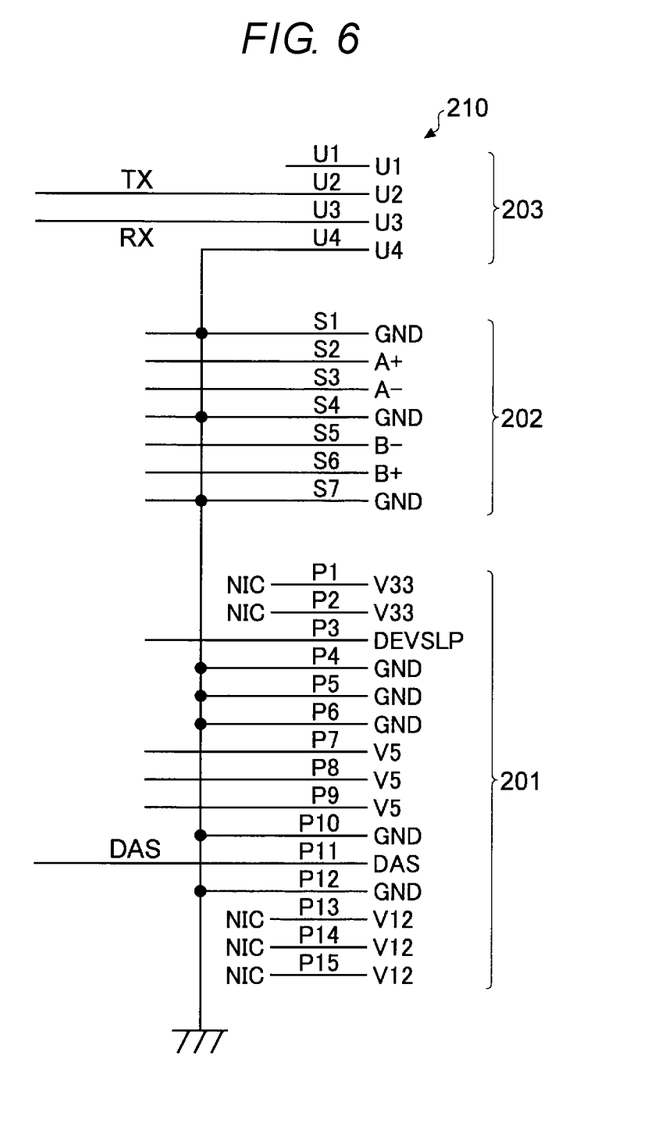
FIG. 6 illustrates a terminal group of the external device depicted in FIG. 4.
Figure 7:
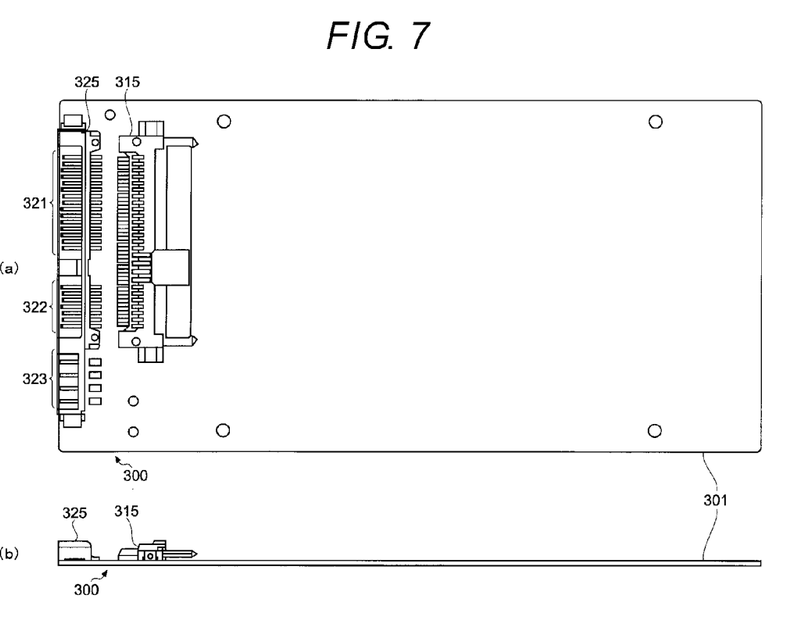
FIG. 7 illustrates the relay device according to the embodiment. (a) and (b) of FIG. 7 are, respectively, a plan view and a side view of the relay device.
Figure 8:
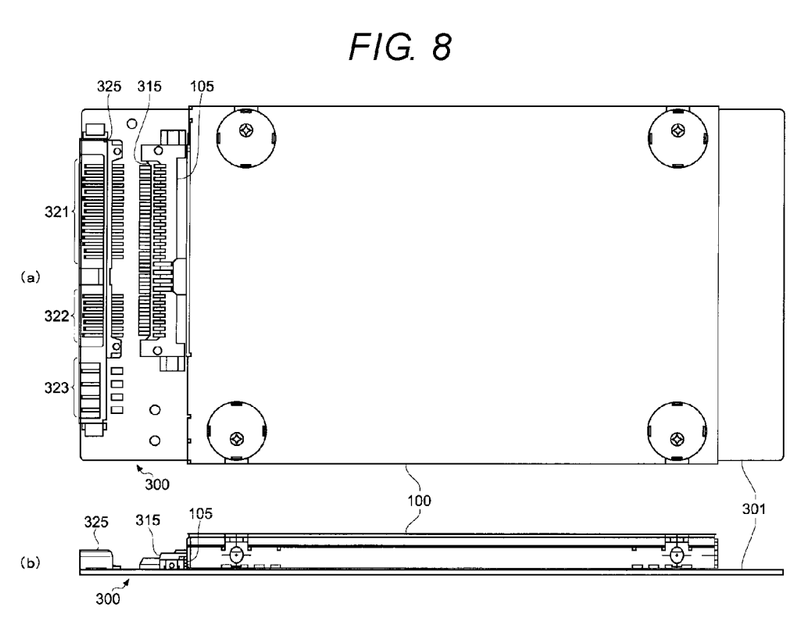
FIG. 8 illustrates the relay device on which the semiconductor device is disposed. (a) and (b) of FIG. 8 are, respectively, a plan view and a side view of the relay device.

FIG. 4 illustrates the semiconductor device and the external device connected via the relay device according to the present embodiment. FIG. 5 illustrates terminal groups of the relay device depicted in FIG. 4. FIG. 6 illustrates a terminal group of the external device depicted in FIG. 4. (a) and (b) of FIG. 7 are a plan view and a side view of the relay device, respectively. (a) and (b) of FIG. 8 are a plan view and a side view of the relay device connected to the semiconductor device, respectively.

As depicted in FIG. 4, a relay device 300 includes an SATA connector (second connector) 310 having no expansion terminal and an SATA connector (third connector) 320 having an expansion terminal. The SATA connector 310 having no expansion terminal is connected to the SATA connector 9 of the semiconductor device 100. On the other hand, the SATA connector 320 having the expansion terminal is connected to an SATA connector 210 of an external device 200.

As depicted in FIG. 5, the SATA connector 310 having no expansion terminal is a connector connectable to the standard SATA interface connector and includes a DC output terminal group (third terminal group) 311 for power supply output and an SATA interface terminal group (fourth terminal group) 312 for data input and output. The terminals of the SATA connector 310 correspond to the terminals of the SATA connector 9 of the semiconductor device 100, and the corresponding terminals are electrically connected to each other as a result of the semiconductor device 100 being inserted into the connector 310 of a relay device (substrate) 300. For example, the DC output terminal group 311 includes power supply terminals (fourth to sixth power supply terminals) for DC +12 V, DC +3.3 V, and DC +5 V, and a DEVSLP terminal (fourth signal terminal) corresponding to the DEVSLP terminal of the semiconductor device 100.

On the other hand, the SATA connector 320 has, in addition to a terminal group (fifth terminal group) formed of a DC input terminal group 321 and an SATA interface terminal group 322 as standard terminals, an expansion terminal group 323 formed of four expansion terminals U1 to U4.

As depicted in FIG. 6, as is the case of the SATA connector 320 of the relay device 300, the SATA connector 210 of the external device 200 includes, in addition to a DC input terminal group 201 and an SATA interface terminal group 202 as standard terminals, an expansion terminal group 203 formed of four terminals U1 to U4. The terminals of the SATA connector 210 correspond to the terminals of the SATA connector 320 of the relay device 300, and the corresponding terminals are electrically connected to each other as a result of the relay device 300 being inserted into the external device 200.

Through internal wiring of the relay device 300, a terminal P15 of the SATA connector 310 (fourth power supply terminal) for the UART_RX signal is connected to an expansion terminal U2 (second expansion terminal) of the SATA connector 320 via a wire (eighth wire). As a result, a UART signal input to the relay device 300 from the external device 200 via the expansion terminal U2 of the SATA connector 320 is transferred to the semiconductor device 100 as a UART_RX signal via the terminal P15 (V12 terminal) of the DC output terminal group 311 of the SATA connector 310.

Moreover, a wire (sixth wire) connected to a terminal P11 (third signal terminal) of the SATA connector 310 for the UART_TX signal is bifurcated into two branches, and one of the two branches is connected to a terminal P11 (fifth signal terminal), which is a DAS terminal of the DC input terminal group 321 of the SATA connector 320, and the other is connected to an expansion terminal U3 (first expansion terminal) as a wire (seventh wire) obtained by bifurcation. As a result, the UART_TX signal output from the semiconductor device 100 to the terminal P11 (DAS terminal) of the DC output terminal group 311 of the SATA connector 310 is transferred to the external device 200 via the expansion terminal U3 of the SATA connector 320.

As depicted in FIG. 7, for example, the relay device 300 having the connector structure depicted in FIG. 5 may have a structure in which a socket 315 housing the SATA connector 310 and a socket 325 housing the SATA connector 320 are mounted on a wiring substrate 301. Here, (a) of FIG. 7 illustrates a plan view of the relay device 300 from the above, and (b) of FIG. 7 illustrates a side view of the relay device 300. As depicted in FIG. 7, on the wiring substrate 301, a wire connecting the terminal P15 of the SATA connector 310 and the terminal U2 of the SATA connector 320 and a wire connecting the terminal P11 of the SATA connector 310 and the terminals U3 and P11 of the SATA connector 320 are formed. Moreover, on the wiring substrate 301, wires connecting the terminals other than the terminals P11 and P15 of the SATA connector 310 to the corresponding terminals of the SATA connector 320 are also formed.

On the relay device 300 having such a structure, as depicted in FIG. 8, the semiconductor device 100 is mounted by inserting a socket 105, which houses the SATA connector 9, into the socket 315 of the relay device 300. Here, (a) of FIG. 8 is a plan view of the semiconductor device 100 disposed on the relay device 300 viewed from the above, and (b) of FIG. 8 is a side view of the semiconductor device 100 disposed on the relay device 300. Moreover, the relay device 300 is connected to the external device 200 by inserting the socket 325, which houses the SATA connector 320, into a socket (not depicted in the drawing) of the external device 200.

As described above, in the present embodiment, an unused terminal (terminal P15) is assigned to receive the UART_RX signal. Moreover, the present embodiment is configured such that output of the DAS signal and output of the UART_TX signal in the drive control circuit 4 are assigned to the same terminal (terminal P11) of the SATA connector 9 and these signals are multiplexed. With these configurations, according to the present embodiment, since the semiconductor device 100 can be connected to the external device 200 such as the tester for debugging and the computer for loading a program without the need for an expansion terminal, an increase in design cost, parts cost, and so forth of the semiconductor device 100 can be suppressed. Furthermore, since the semiconductor device 100 can be connected to the external device 200 having an expansion terminal by using the relay device 300 relaying the SATA connector having no expansion terminal and the SATA connector having the expansion terminal, the existing tester and computer having the expansion terminal can be used without change, whereby an increase in design cost, parts cost, and so forth of the tester for debugging and the computer for loading a program can also be suppressed.

The embodiment described above shows, as an example, a case in which a UART signal is communicated between the semiconductor device 100 and the external device 200, but the embodiment is not limited thereto. For example, the embodiment described above can also be applied to a serial signal which is transmitted by a two wire system between the external device 200 and a universal serial bus (USB) or the like.

Moreover, the embodiment described above shows, as an example of the semiconductor device 100, the 2.5-inch SSD including a plurality of NAND memories 10 mounted thereon, but the embodiment is not limited thereto. For example, the embodiment described above can also be applied to a 2.5-inch hard disk drive (HDD).

Furthermore, the embodiment described above shows, as an example of the SATA interface 2, an SATA interface that complies with Serial ATA Specification Revision 1.0, but the embodiment is not limited thereto. For example, an SATA interface that complies with Serial ATA Specification Revision 1.0a, 2.0, 2.5, 2.6, or 3.0 or an SATA interface that complies with a specification, such as SATA express, which permits the use of a standard SATA interface connector can also be used as the SATA interface 2.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A semiconductor device, comprising:
    a substrate having a serial advanced technology attachment (SATA) connector that has a plurality of power supply terminals and a plurality of signal terminals;
    a nonvolatile semiconductor memory unit disposed on the substrate; and
    a memory control circuit disposed on the substrate, configured to control the nonvolatile semiconductor memory unit, and having a data input terminal connected to a first power supply terminal of the SATA connector and a data output terminal connected to a second power supply terminal of the SATA connector, wherein
    a serial signal of input data is transmitted from the first power supply terminal to the data input terminal, and a serial signal of output data is transmitted from the data output terminal to the second power supply terminal, and
    the memory control circuit also includes a signal terminal from which a data activity signal is output, and said signal terminal is also connected to the second power supply terminal.

2. The semiconductor device according to claim 1, wherein
    the plurality of signal terminals is connected to the memory control circuit, and
    when communication between the signal terminals of the SATA connector and the memory control circuit is carried out in accordance with SATA protocol, the memory control circuit does not use the serial signal of input data.

3. The semiconductor device according to claim 2, wherein
    when the communication between the signal terminals of the SATA connector and the memory control circuit is carried out in accordance with the SATA protocol, a mode change signal is transmitted through the second power supply terminal of the SATA connector.

4. The semiconductor device according to claim 1, wherein
    when communication between the signal terminals of the SATA connector and the memory control circuit is carried out in accordance with SATA protocol, the data activity signal is transmitted from the signal terminal of the memory control circuit to the second power supply terminal.

5. The semiconductor device according to claim 1, wherein
    the plurality of power supply terminals includes a terminal for DC +12V, a terminal for DC +3.3V, and a terminal for DC +5V.

6. The semiconductor device according to claim 1, further comprising:
    a pullup circuit connected between the first power supply terminal and the data input terminal of the memory control circuit.

7. The semiconductor device according to claim 1, wherein
    the SATA connector is disposed along an edge of the substrate.

8. The semiconductor device according to claim 1, wherein
    the plurality of power supply terminals of the SATA connector consists of 15 power supply terminals, and
    the plurality of signal terminals of the SATA connector consists of 7 signal terminals.

9. The semiconductor device according to claim 1, wherein
    part of the power supply terminals and part of the signal terminals are connected to ground.

10. The semiconductor device according to claim 1, wherein
    the input data include a program that is executed to perform a data access with respect to the nonvolatile semiconductor memory unit.

11. The semiconductor device according to claim 1, wherein
    the SATA connector includes no expansion terminal.

12. A method for transmitting data in a semiconductor device including a serial advanced technology attachment (SATA) connector that has a plurality of power supply terminals and a plurality of signal terminals, a nonvolatile semiconductor memory unit, and a memory control circuit, the method comprising:
    transmitting a serial signal of input data from a first power supply terminal of the SATA connector to a data input terminal of the memory control circuit;
    transmitting a serial signal of output data from a data output terminal of the memory control circuit to a second power supply terminal of the SATA connectors;
    transmitting input data from at least one of the signal terminals to the memory control circuit in accordance with SATA protocol;

transmitting output data from the memory control circuit to another one of the signal terminals in accordance with the SATA protocol; and when the transmission of the input data and the output data in accordance with the SATA protocol is carried out, transmitting a data activity signal from the memory control circuit to the second power supply terminal.

13. The method according to claim 12, wherein
the serial signal of input data and the serial signal of output data are not in accordance with the SATA protocol.

14. The method according to claim 12, wherein
when the transmission of the input data and the output data in accordance with the SATA protocol is carried out, the serial signal of input data is not transmitted.

15. The method according to claim 12, further comprising:

when the transmission of the input data and the output data in accordance with the SATA protocol is carried out, transmitting a mode change signal through the second power supply terminal of the SATA connector to the memory control circuit.

16. The method according to claim 12, wherein
the input data include a program that is executed to perform a data access with respect to the nonvolatile semiconductor memory unit.

17. The method according to claim 12, wherein
the SATA connector includes no expansion terminal.

* * * * *